March 22, 1966  E. J. BRUTTEN ETAL  3,241,431
MEASUREMENT OF FINGERPRINT DENSITY APPARATUS AND METHOD
Filed July 23, 1962  4 Sheets-Sheet 1
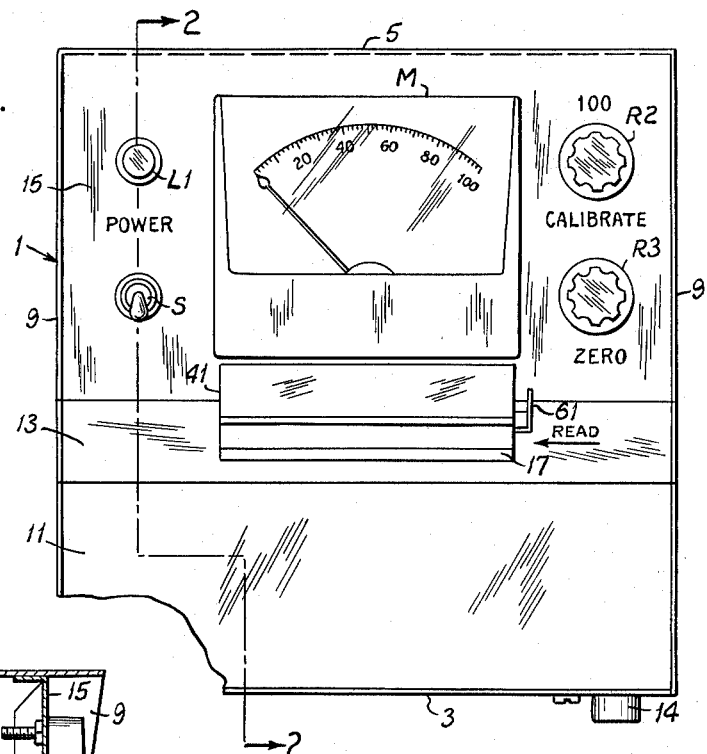
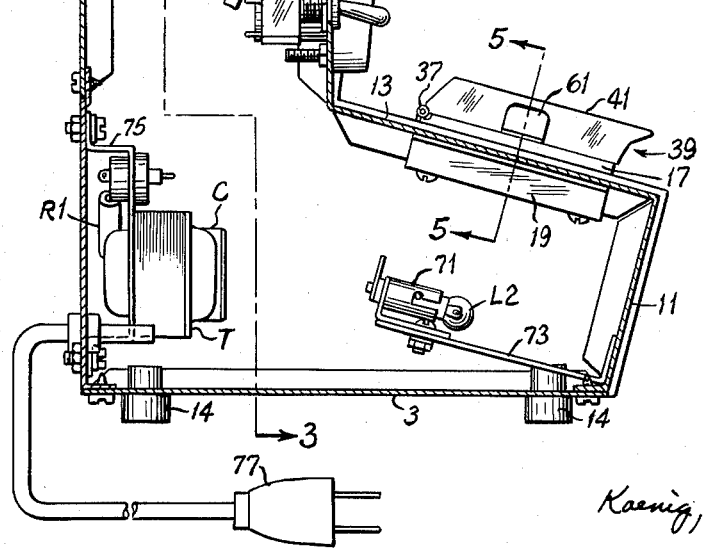

March 22, 1966  E. J. BRUTTEN ETAL  3,241,431
MEASUREMENT OF FINGERPRINT DENSITY APPARATUS AND METHOD
Filed July 23, 1962  4 Sheets-Sheet 2

United States Patent Office 3,241,431
Patented Mar. 22, 1966

3,241,431
MEASUREMENT OF FINGERPRINT DENSITY APPARATUS AND METHOD
Eugene J. Brutten, William L. Pudil, and Hideo Koike, Carbondale, and Robert J. Falk, Skokie, Ill., assignors to Southern Illinois University Foundation, Carbondale, Ill., a corporation of Illinois
Filed July 23, 1962, Ser. No. 211,519
2 Claims. (Cl. 88—14)

This invention relates to measurement of fingerprint density and more particularly to novel apparatus and methods for accurately measuring the density of fingerprints obtained in the so-called palmar sweat method of measuring anxiety.

As is pointed out in copending application Serial No. 154,467, filed Nov. 24, 1961, behavioral scientists have been concerned with devising an objective measure of anxiety. To this end, it was discovered that sensory stimuli indicative of anticipatory apprehension provoked fingertip sweating without affecting a change in general bodily sweating. This led to the development of a discrete and objective index for measuring anxiety. Procedurally, this measure is based upon the chemical reaction which obtains when perspiration soluble anhydrous ferric chloride, applied to the palmar side of the fingertips, is brought into contact with a tannic acid bearing agent such as a strip of film containing a uniform emulsion saturated with tannic acid. Since the reaction of the anhydrous ferric chloride and tannic acid produces an ink fingerprint which is a dependent function of the extent of fingertip perspiration, the resulting darkness of the print is considered indicative of the degree of anxiety.

Initially, palmar sweat prints obtained in this manner were evaluated visually on a four-point scale of darkness representing faint to intense sweating. While this means of measuring anxiety was considered to have a certain measure of validity, meters were devised to supplant visual evaluation and permit greater sensitivity in such measurements. Although such meters allow more minute differences in the intensity or density of prints to be measured, they suffer from certain shortcomings which limit their general utility. Thus, the meters now in use are essentially experimental in nature, stationary rather than portable, lack standardization, require the manipulation of the fingerprint bearing film or slide during measurement, lack reliability in print-photocell realignment in repeated measurement, and also require the use of darkroom facilities in order to obviate the variable error of extraneous light differences. The present invention provides apparatus and methods which overcome the above stated difficulties and meet the needs of both clinicians and experimental workers, and constitutes an improvement of the apparatus and methods of the aforesaid copending application.

Among the several objects of the invention, therefore, may be mentioned the provision of apparatus for accurately and objectively measuring the intensity or density of fingerprints obtained in the practice of the palmar sweat method; the provision of such apparatus which does not require the use of darkroom facilities or the manipulation of the fingerprint bearing film or slide during measurement; the provision of such apparatus which is capable of indicating the density of fingerprints directly in terms of percentage of opaqueness of these fingerprints; the provision of such apparatus which is of relatively simple construction, rugged, and easy to operate; and the provision of improved methods of measuring the density of fingerprints by determining the percentage of opaqueness of a translucent strip carrying the fingerprints. Other objects and features will be in part apparent and in part pointed out hereinafter.

Essentially, in accordance with the present invention, apparatus for measuring the density of fingerprints carried by a strip of translucent material having a clear area and a fingerprint area is provided. This apparatus includes two photoconductive or light sensitive elements positioned in light receiving relationship with a source of illumination. Means for holding this translucent material between the photoconductive elements and the source of illumination with the fingerprint area positioned between one of the photoconductive elements and this source is provided, along with a resistance bridge circuit having four arms. One of the four arms of this bridge includes one of the photoconductive elements and a second arm includes the other element. The bridge circuit includes an indicating means for indicating the density of the fingerprint area of the translucent material by measuring the difference in resistance of the photoconductive elements caused by the difference in intensities of illumination received thereby.

The method of the invention provides a determination of the percentage of opaqueness of a strip of translucent material carrying a fingerprint, and thus a measurement of the density of this fingerprint. This method includes the steps of illuminating a pair of light responsive elements with energy from a source of luminous energy, and adjusting a measuring means (for example, a resistance bridge circuit), which indicates any difference in respective intensities of energy received by the light responsive elements, to indicate no difference in these intensities. The method further comprises the steps of illuminating only one of the light responsive elements with energy from the source of luminous energy, then adjusting the measuring means to indicate a maximum difference in the respective intensities of the energy received by the elements, positioning the fingerprint area of the translucent strip which carries the fingerprint between the other of the light responsive elements and the source, and finally measuring the difference in the respective intensities of energy received by the elements. This last measurement indicates directly the percentage of opaqueness of the fingerprint area.

The invention accordingly comprises the constructions and methods hereinafter described, the scope of the invention being indicated in the following claims.

In the accompanying drawings, in which two of various possible embodiments of the invention are illustrated, FIG. 1 is a front view of one exemplary embodiment of the apparatus of the present invention;

FIG. 2 is a cross section of this apparatus taken on line 2—2 of FIG. 1;

Corresponding reference characters indicate corresponding parts throughout the several views of the drawings.

Figure 3:
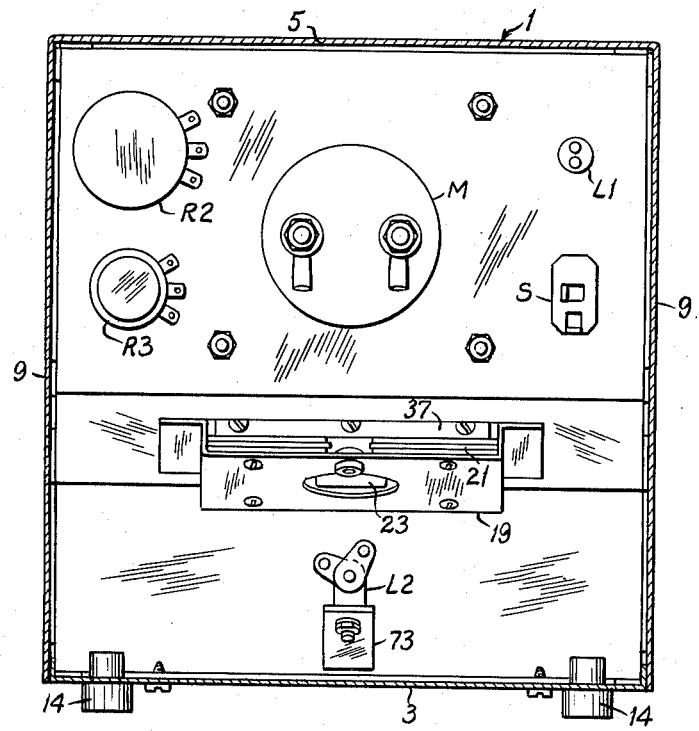
FIG. 3 is a view looking into the rear of the apparatus of FIG. 1, along line 3—3 of FIG. 2.

Referring to the drawings, an apparatus constructed in accordance with this invention is shown to comprise a housing or cabinet designated in its entirety by the reference numeral 1. More particularly, the cabinet comprises a bottom wall 3, a top wall 5, a back wall 7, and side walls 9. It also has a lower front wall portion 11 which is inclined in an upward and forward direction from the front edge of the bottom wall, a panel 13 inclined upwardly and rearwardly from the upper edge of the portion 11, and an upper vertical front wall portion 15 extending upwardly from the rear edge of panel 13. Housing 1 is supported by four legs 14.

Panel 13 has a rectangular opening therein which receives a relatively thick, preferably metal plate 17. This plate is held in registry with the rectangular opening with its face generally flush with panel 13 by a tray 19 and a plurality of plates 21. Plate 17 has a centrally located recess 23 which communicates with a pair of apertures 25 and 27 extending through the top of plate 17. A second pair of apertures 29 and 31 through plate 17 receive two upstanding pegs 33 and 35 respectively therein. Tray 19 and plates 21 form apertures coaxial with and at least as large as recess 23.

Figure 5:
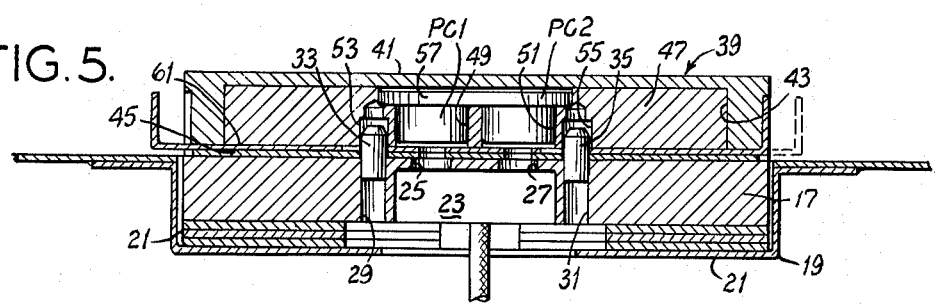
FIG. 5 is a cross section taken on line 5—5 in FIG. 2 illustrating the film holder component of the FIG. 1 apparatus.
Figure 6:
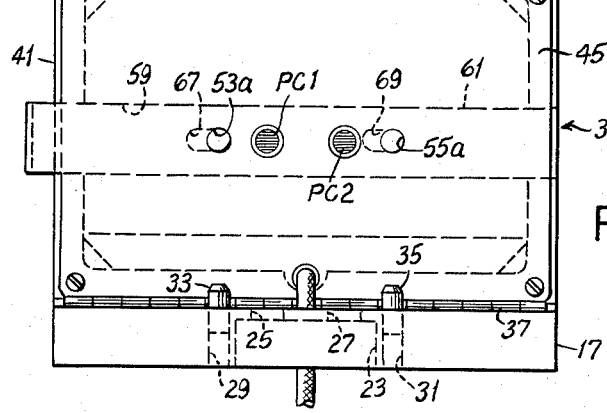
FIG. 6 is a view of this film holder component illustrating the positioning of the light responsive elements therein.

Secured to the rear edge of plate 17 by means of a hinge 37 is a housing indicated generally by reference numeral 39. Housing 39 is constituted by a member 41 having a relatively large recess 43 closed at its bottom by a plate 45 to form a chamber. Within this chamber is positioned a plate or block 47 having four apertures 49, 51, 53 and 55 therein. Member 41, plate 45 and block 47 are made of an opaque material, preferably of metal. Apertures 49 and 51 receive two light responsive or photoconductive elements PC1 and PC2 respectively. These photoconductive elements are secured to a mounting plate 57 which is received in a recess formed in block 47. A groove 59 is formed in block 47 to receive an opaque slide bar 61. This bar has a pair of circular apertures 63 and 65 and a pair of elongate apertures 67 and 69 therein. Bar 61 is slidable in groove 59 and with the bar in its extreme left position (such as illustrated in FIGS. 5 and 6) the apertures 63 and 65 are positioned over light responsive elements PC1 and PC2 respectively. When bar 61 is in its extreme right position, on the other hand (a condition illustrated in FIG. 1) apertures 63 and 65 are not in registry with PC1 and PC2, and bar 61 closes housing 39 preventing any light from impinging on these light responsive elements. Bar 61 thus constitutes a shutter member. When in the extreme right position bar 61 will be said to be in its closed position. When apertures 63 and 65 are positioned over photoconductors PC1 and PC2 permitting light to impinge thereon, the bar 61 will be said to be in its "Read" or open position. Bottom plate 45 has a plurality of apertures 49a, 51a, 53a and 55a which are coaxial with apertures 49, 51, 53 and 55 respectively. When housing 39 is closed upon the top surface of plate 17 in facing contact therewith, peg 33 extends through aperture 53a, elongate slot 67 in slide bar 61, and into aperture 53; and peg 35 extends through aperture 55a, elongate slot 69 in bar 61 and into aperture 55. With housing 39 in this position, apertures 49a and 51a are positioned over apertures 25 and 27 respectively.

Plate 17 and housing 39 constitute a film holder in which is placed (between the lower surface of plate 45 and the upper surface of plate 17) the translucent strip carrying the fingerprint whose density is to be measured. This strip has a fingerprint area and a clear area and, as explained hereinafter, has aligning holes therein which by receiving pegs 33 and 35 insure that the fingerprint area is properly positioned over one of the apertures 25 or 27, with the clear area properly positioned over the other aperture.

Figure 4:
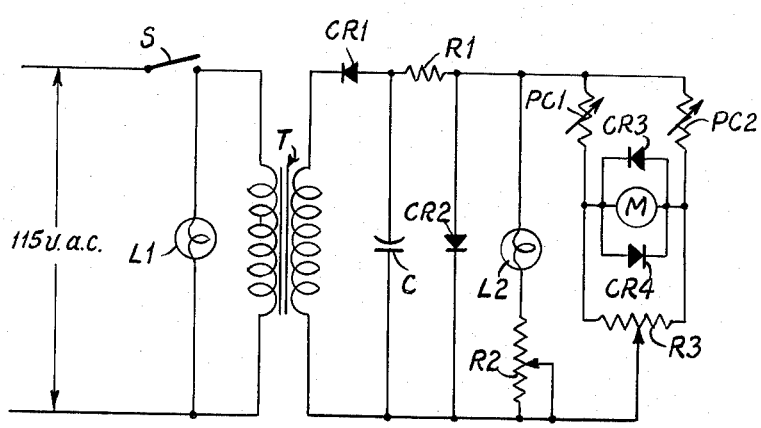
FIG. 4 is a schematic diagram illustrating the electrical components of the apparatus of FIG. 1 and their interconnection.

The various electrical components of the apparatus of this invention and their interconnection are illustrated in FIG. 4. Broadly these components include a regulated power supply, a source of luminous energy, and a measuring means which includes photoconductive elements PC1 and PC2. The regulated power supply is illustrated in FIG. 4 as including an input circuit connected to an A.C. voltage source, a main switch S, a pilot light L1, a step-down transformer T, a rectifying diode CR1, a smoothing capacitor C, a resistor R1, and a voltage regulating Zener diode CR2. Connected across the output of this power supply is the source of luminous energy constituted by an incandescent lamp L2 in series with a variable resistance or calibrating rheostat or potentiometer R2. Also connected across the power supply and in parallel with the source of luminous energy is the measuring means constituted by a resistance bridge circuit which includes the two photoconductors PC1 and PC2, a calibrating potentiometer R3, a voltmeter M and two Zener diodes CR3 and CR4 connected back to back across meter M. The resistance bridge circuit has four arms or branches, one including photoconductive element PC1; a second including photoconductive element PC2; a third, a controlled portion of the resistance R3; and a fourth, the remainder of R3. Light responsive or photoconductive elements PC1 and PC2 each have an electrical resistance which varies as a function of the intensity of the luminous energy impinging thereon.

Switch S, pilot light L1, meter M, and potentiometers R2 and R3 are mounted on panel 15. The incandescent lamp L2 is positioned centrally below plate 17 in a socket 71 which is mounted on a bracket 73 secured to panel 11. The remaining electrical components of the apparatus are mounted on a board 75 bolted to wall 7. In the interest of clarity the actual wiring within housing 1 has not been illustrated.

The above described apparatus is capable of indicating directly, on meter M, the percentage of opaqueness of a fingerprint obtained in the so-called palmar sweat method of measuring anxiety to obtain such a reading. While any indicia may be inscribed on the face of meter M, it is preferred that a 0–100 scale be inscribed thereon to indicate this percentage directly. A strip of translucent material having a clear area and a fingerprint area is positioned in the film holder portion of the apparatus between housing 1 and housing 39, with the center whorl of the fingerprint positioned between the source of luminous energy and one of the light responsive elements, and the clear area of the strip positioned between this source and the other light responsive element. Pegs 33 and 35 are adapted to extend through aligning holes or openings in the translucent film insuring proper positioning in the film holder. Fingerprinting apparatus for applying fingerprints to a strip of translucent film in a uniform manner, and punching apparatus for punching properly positioned aligning holes therein are disclosed respectively in copending applications Serial No. 212,550, filed July 26, 1962 and Serial No. 187,777, filed Apr. 16, 1962, issued as Patents 3,163,557, dated Dec. 29, 1964, and 3,161,101, dated Dec. 15, 1964, respectively.

In operation, the power supply input is connected to a source of A.C. power by plug 77, and switch S is closed. The power supply applies substantially constant D.C. voltage across the source of luminous energy and the measuring bridge circuit. The intensity of the luminous energy supplied by source L2 may be adjusted by the setting of potentiometer R2. The bridge circuit may be balanced by adjusting potentiometer R3.

After initial calibration (which is described hereinafter), the film carrying the fingerprint whose density is to be measured is placed in the film holder between plates 17 and 45 with the clear area of the film over one of the photoconductive elements and the fingerprint over the other. This causes a difference in the relative intensities of the luminous energy received by the light responsive elements causing in turn their respective electrical resistances to vary. The resulting difference in resistances brings about an unbalance in the bridge circuit giving rise to a potential difference across meter M. This potential difference, after proper calibration, is directly proportional to the percentage of opaqueness of the fingerprint area of the translucent strip, and is indicated directly on meter M.

For initial calibration, before the translucent strip is placed in the film holder, housing 39 is closed upon plate 17 and bar 61 is moved to its "Read" position. This places both of the photoconductors PC1 and PC2 in equally unobstructed light receiving relationship with the source of luminous energy L2. Zero calibration is achieved by adjusting the rotor or slider of potentiometer R3 until the resistance bridge circuit is balanced as indicated by a zero reading on meter M. The measuring means is thus adjusted to indicate that there is no difference in the respective intensities of the luminous energy received by elements PC1 and PC2. Next the bar 61 is moved to its extreme right or closed position blanking both photoconductive elements, and housing 39 is rotated about hinge 37 to its open position. An opaque material or tape is placed over one of the apertures 49a or 51a, say 49a, masking one of the photoconductors, say PC1. The housing is again closed upon plate 17 and bar 61 again moved to its "Read" position. This time the luminous energy from L2 is received by photoconductive element PC2 but, because of the opaque material, is not received by element PC1. Under these conditions, the sensitivity of meter M should be such that it indicates a maximum difference in the respective intensities received by the light responsive elements; or, stated somewhat differently, meter M should indicate that the masking material is 100% opaque. Full scale or 100% calibration is achieved by adjusting potentiometer R2 to vary the intensity of illumination provided by the source L2 until the full scale deflection of meter M indicates an opaqueness of 100%, the preselected maximum. Bar 61 is again moved to its extreme right position, housing 39 is opened, and the opaque masking material removed. The translucent strip of material carrying the fingerprint is then placed in a film holder with the whorl of the fingerprint positioned over aperture 25 in plate 17 (assuming as above that photoconductor PC1 was the photoconductor masked by the opaque material) and the clear area over aperture 27. Housing 39 is closed and bar 61 is again moved to its "Read" position. This places the fingerprint area between the source of luminous energy and photoconductor PC1, while the clear area of the translucent strip is positioned between this source and photoconductor PC2. Meter M then indicates the percentage of opaqueness of the fingerprint area as compared with the clear area.

Zener diodes CR3 and CR4 connected across meter M each have a breakdown voltage just greater than the full scale deflection voltage of this meter and are included in the bridge circuit to protect the meter movement from possible damage in the event of improper operation of the apparatus. Bar 61 serves to protect the two photoconductive elements from damage which might result from their being exposed to excessive light. This bar should be placed in its extreme right or closed position whenever housing 39 is to be opened, and should be placed in the "Read" position only when housing 39 is closed upon plate 17.

Figure 9:
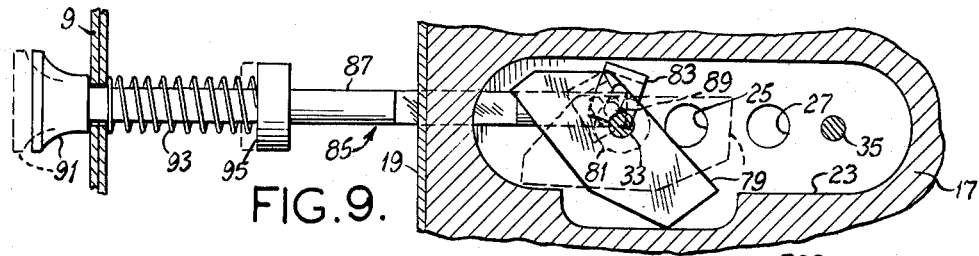
FIG. 9 is a cross section of this modification taken on line 9—9 in FIG. 8.
Figure 8:
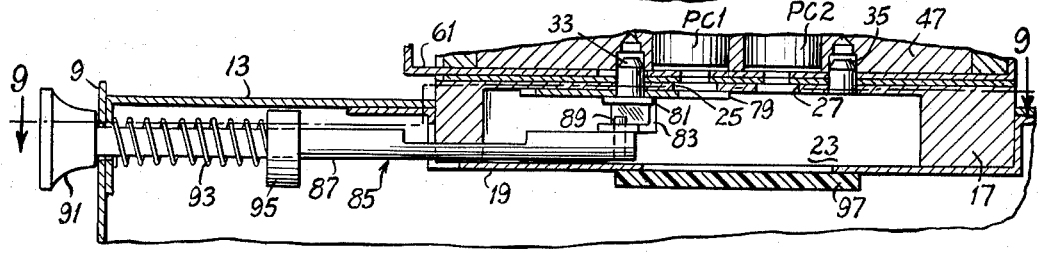
FIG. 8 is a fragmentary view illustrating a modification of the FIG. 1 apparatus.
Figure 7:
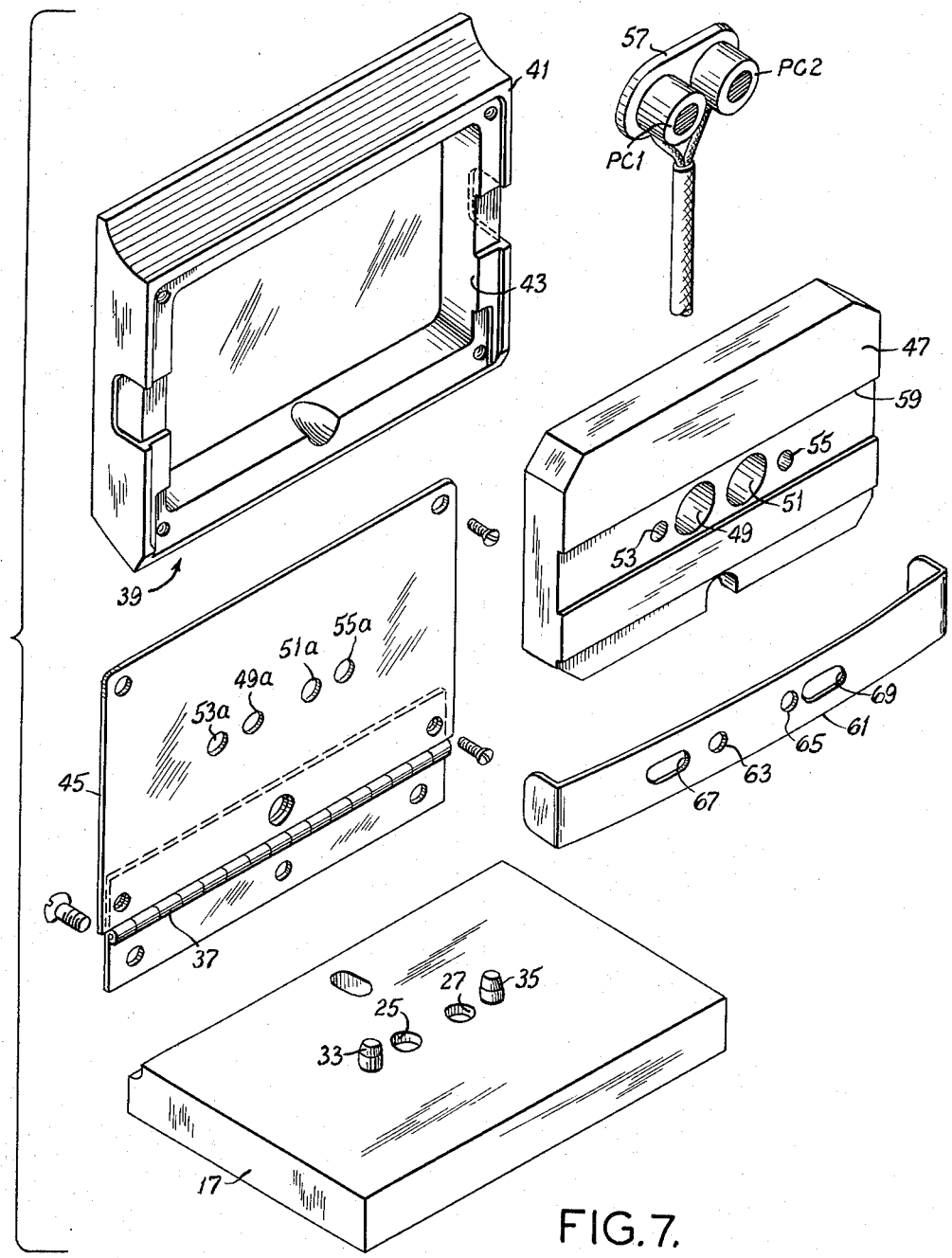
FIG. 7 is an exploded view of this film holder illustrating its various components.

FIGS. 8 and 9 illustrate a modification of the FIG. 1 apparatus which simplifies initial calibration. This modification consists essentially in the provision of a second shutter member which may be positioned by a tripping lever to blank one of the apertures in plate 17 during the "100% calibration" step, thereby avoiding the necessity of covering one of the photocells PC1 or PC2 with a piece of opaque material. Specifically, this shutter arrangement comprises a movable opaque blade 79 positioned immediately adjacent the underside of plate 17 within recess 23. This blade is supported by a flange 81 secured to pin 33 and is rotatable about this pin. Integral with blade 79 and extending below flange 81 is a pivot arm 83 which has an elongated aperture therein. A tripping mechanism or shutter actuator 85 is provided to selectively position blade 79. This actuator includes a shaft 87 which is carried through side wall 9, tray 19 and a groove in plate 17. Secured at one end of shaft 87 is a pin 89 which is received in the elongated aperture in pivot arm 83. At the other end of shaft 87 is secured a knob 91 exterior to housing 1. A compression spring 93 encircles a portion of shaft 87 and bears against both the inner surface of side wall 9 and a collar 95 which is secured to shaft 87 by a set screw. Spring 93 normally maintains shaft 87 in its extreme right position (as illustrated in FIGS. 8 and 9), thereby rotating blade 79 to its extreme clockwise position (the position illustrated in solid lines in FIG. 9). In this position of blade 79, light from source L2 may pass through aperture 25 and impinge upon photoconductor PC1. Pulling knob 91 to its left position (illustrated in dotted lines in FIG. 9) moves shaft 87 to the left, thereby rotating blade 79 counterclockwise about pin 33. This places blade 79 over aperture 25 thereby preventing light from source L2 from reaching photoconductor PC1. Also included in the FIG. 8 modification is a piece 97 of translucent material, attached to the bottom side of tray 19 and enclosing recess 23. This translucent material not only diffuses the light from source L2, but also serves to protect the shutter mechanism within the recess.

The operation of the FIG. 1 apparatus as modified in accordance with FIGS. 8 and 9 is the same as that outlined above with the exception that the shutter arrangement makes it unnecessary during the full scale or "100% calibration" step of initial calibration to rotate housing 39 to its open position and mask photoconductor PC1 with a piece of opaque masking material. Instead, during the full scale or 100% calibration step, housing 39 is maintained in its closed position and to mask photoconductor PC1, i.e., to prevent light from source L2 from reaching this photoconductor, it is only necessary to move knob 91 to the left thereby positioning blade 79 over aperture 25. This greatly simplifies the initial calibration procedure, and moreover insures that the proper light responsive element is masked during the 100% calibration step.

It is to be understood that in addition to the measurement of the density of fingerprints, the density of prints of other portions of the body may also be measured according to the present invention simply by designing the various apertures in the two housings 1 and 39 to be of appropriate dimensions. Accordingly, the term fingerprint as used herein should be construed to include not only fingerprints as such, but also prints of other portions of the body.

As various changes could be made in the above constructions and methods without departing from the scope of the invention, it is intended that all matter contained in the above description and shown in the accompanying drawings be interpreted as illustrative and not in a limiting sense.

In view of the above, it will be seen that the several objects of the invention are achieved and other advantageous results attained.

What is claimed is:

1. Apparatus for measuring the density of a fingerprint carried by a strip of translucent material having a clear area and a fingerprint area, said apparatus comprising a source of luminous energy, means for holding said strip for illumination by said source equally on said fingerprint area and said clear area, first and second photoconductive elements, means defining a first light path between said source and said first photoconductive element, said first path passing through the fingerprint area of said strip, means defining a second light path between said source and said second photoconductive element, said second path passing through said clear area of said strip, said light paths being equally unobstructed in the absence of a strip, a resistance bridge circuit having four arms one of which includes said first photoconductive element and another of which includes said second photoconductive element, calibrated indicating means for indicating the degree of unbalance of said bridge, means for balancing said bridge when said photoconductive elements are equally illuminated, a shutter blade pivotally mounted adjacent one of said photoconductive elements for selectively blocking said first path, a manually operable member extending from said apparatus for moving said shutter blade from a first position in which said shutter blade is clear of said first path and a second position in which said shutter blade lies between said first photoconductive element and said source of luminous energy thereby blocking said first path, and means for varying the luminous intensity of said source to obtain a preselected maximum indication on said calibrated indicating means when said first path is so blocked by said shutter blade whereby the calibration of said indicating means represents the opaqueness of the fingerprint area of said strip.

2. Apparatus for measuring the density of a fingerprint carried by a strip of translucent material having a clear area and a fingerprint area, said apparatus comprising an incandescent source of luminous energy, means for holding said strip for illumination by said source equally on said fingerprint area and said clear area, first and second photoconductive elements, means defining a first light path between said source and said first photoconductive element, said first path passing through the fingerprint area of said strip, means defining a second light path between said source and said second photoconductive element, said second path passing through said clear area of said strip, said light paths being equally unobstructed in the absence of a strip, a first shutter member which is movable from a first position to a second position and which in said first position permits the photoconductive elements to receive luminous energy and which in said second position prevents both of said photoconductive elements from receiving luminous energy, a resistance bridge circuit having four arms one of which includes said first photoconductive element and another of which includes said second photoconductive element, a calibrated meter for indicating the degree of unbalance of said bridge, a variable resistance element included in said bridge for balancing said bridge when said photoconductive elements are equally illuminated, a second shutter member for selectively blocking one of said paths, and a rheostat for varying the luminous intensity of said source to obtain a preselected maximum indication on said meter when said one path is so blocked whereby the calibration of said meter represents the opaqueness of the fingerprint area of said strip.

References Cited by the Examiner

UNITED STATES PATENTS

| 1,602,121 | 10/1926 | Ramsey. | |
| 1,973,906 | 8/1934 | Levene et al. | 250—53 |
| 2,044,131 | 6/1936 | Staege | 88—14 |
| 2,427,013 | 9/1947 | MacAdams | 88—14 |
| 3,012,466 | 12/1961 | Wiebe | 88—14 |
| 3,028,496 | 4/1962 | Kennard et al. | 250—106 |

OTHER REFERENCES

Neustadt: Photoelectric Color Measuring Instruments, Electronics, vol. 6, May 1933.

Seely: Electron Tube Circuits, McGraw-Hill; 2nd edition (1958); sections 2–10 through 2–13, pages 79–86.

JEWELL H. PEDERSEN, *Primary Examiner.*